Figure 1:
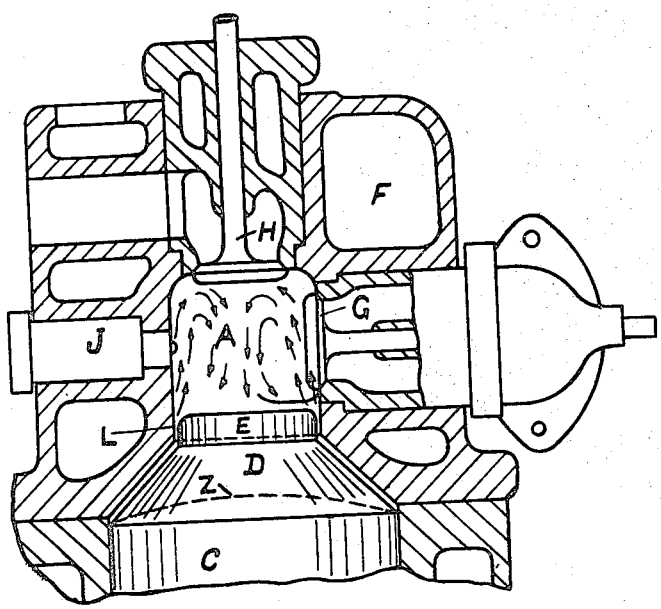

K. I. CROSSLEY AND W. LE P. WEBB.
VERTICAL INTERNAL COMBUSTION GAS AND OIL ENGINE.
APPLICATION FILED JUNE 25, 1918.

1,320,450.

Patented Nov. 4, 1919.
2 SHEETS—SHEET 1.

INVENTORS:
Kenneth Irwin Crossley
Wilfred Le Plastrier Webb
By Wm Wallace White
ATTY.

K. I. CROSSLEY AND W. LE P. WEBB.
VERTICAL INTERNAL COMBUSTION GAS AND OIL ENGINE.
APPLICATION FILED JUNE 25, 1918.

1,320,450.

Patented Nov. 4, 1919.

INVENTORS:
Kenneth Irwin Crossley
Wilfred Le Plastrier Webb
By
Wm Wallace White
ATT'Y.

UNITED STATES PATENT OFFICE.

KENNETH IRWIN CROSSLEY AND WILFRED LE PLASTRIER WEBB, OF OPENSHAW, MANCHESTER, ENGLAND.

VERTICAL INTERNAL-COMBUSTION GAS AND OIL ENGINE.

1,320,450.      Specification of Letters Patent.      Patented Nov. 4, 1919.

Application filed June 25, 1918. Serial No. 241,879.

*To all whom it may concern:*

Be it known that we, Sir KENNETH IRWIN CROSSLEY, baronet, and WILFRED LE PLASTRIER WEBB, both subjects of the King of Great Britain, residing at Pottery Lane, Openshaw, Manchester, in the county of Lancaster, England, have invented new and useful Improvements in Vertical Internal-Combustion Gas and Oil Engines, of which the following is a specification.

Our invention relates to improvements in vertical internal combustion gas and oil engines.

The object of our invention is the production of an improved construction of combustion chamber for a four cycle internal combustion engine which is more particularly suitable for a vertical engine, and which can be used for either (1) a high compression oil engine in which air only is drawn into the cylinder on the suction stroke and compressed into the combustion chamber to a high compression pressure and temperature on the compression stroke, the oil fuel being injected by itself (and without any separate supply of compressed air for assisting the injection and spraying of the oil fuel) in the form of spray into the compressed and heated air toward the end of the compression stroke, the temperature of the air being raised by the high compression to a sufficient degree to produce ignition the moment the oil is sprayed into it; or (2) a gas engine in which the fuel and air are drawn into the cylinder on the suction stroke the mixture being compressed into the combustion chamber on the compression stroke and ignited by means of an electric spark.

In the construction of the combustion chamber we modify and improve on the one described in our previous British patent specification, No. 29337 of 1912. In this previous specification which referred only to engines using oil as fuel, a vaporizer was provided but in our present invention and when using the engine as a high compression oil engine and owing to a higher degree of compression used and the resulting higher temperature the oil is vaporized and ignited by the spraying of the oil into the heated air and no vaporizer or igniter is therefore necessary (unless specially desired as an alternative emergency means of ignition as referred to later) and the combustion chamber is therefore waterjacketed wherever possible.

In our aforesaid specification the air admission valve and the exhaust valve were placed at opposite sides of the combustion chamber. In our present invention we place the exhaust valve at the top end of the combustion chamber so that the valve spindle may be vertical and disposed on or about the axial line of the cylinder, and we place the air admission valve at the side of the combustion chamber with its spindle approximately horizontal. Both valves open directly into the combustion chamber. This arrangement of valves enables a satisfactory scavenging effect to be obtained at the end of the exhaust stroke as described in the previously mentioned specification. The vertical arrangement of the exhaust valve is adapted to prevent any undue wear of the spindle or its guide and consequent defective valve operation such as might occur if the spindle is horizontal.

The oil injector is placed in any suitable position at another side of the combustion chamber and so arranged as to inject the oil as spray horizontally directly into or through the mass of air in the combustion chamber either from a point opposite and directly toward the head of the air admission valve or from the side of and in a direction past the head of the air admission valve. In either case the oil is injected in a direction across or at approximately right-angles to the entering air displaced from the cylinder into the combustion chamber. We prefer the latter disposition because when the engine is being started there may sometimes by chance be an insufficient amount of external force (of compressed air for example if the engine is started by means of compressed air) to enable a powerful turning effort to be given to the engine crankshaft and it might then be necessary to temporarily relieve the compression so much that the temperature of the air at the end of the compression stroke would not be sufficient to ignite the injected oil spray in which case we may prefer to make provision at the side of the combustion chamber about opposite to the oil injector for an electric sparking plug or other form of igniter as a temporary alternative emergency means of igniting the oil spray charges during the first few cycles after the engine is put into motion and until sufficient speed is obtained to allow of full compression. Either of these dispositions of the oil injector in the combustion chamber allows a turbulent swirling effect of the oil spray to take place in a similar manner to that described in our aforesaid specification. The latter of the two dispositions of oil injector (and of the igniter if one is used) enables a compressed air starter valve when required to be conveniently arranged opposite to the air admission valve. It also enables the oil sprayer to be readily removed when required from the combustion chamber casting in the case of engines with several cylinders in line.

We construct the combustion chamber in such a manner that a projection on the end of the oil engine piston may enter it at the end of the compression stroke and create the swirling and eddying effects of the air referred to in our aforesaid specification.

The entrance to the combustion chamber from the cylinder and also the end of the oil engine piston which projects into the entrance to the combustion chamber are circular in form and are of a diameter about equal to or somewhat less than half the diameter of the engine cylinder. We prefer the circular form because both the ends of the oil engine piston and the entrance to the cylinder may then be accurately and cheaply machined if desired.

The combustion chamber is of substantially cylindrical cross section placed axially with the cylinder and is of a diameter about equal to or somewhat less than half the diameter of the cylinder. This form is of necessity somewhat modified locally in the neighborhood of the air admission valve to enable the air to enter the combustion chamber freely when the valve is open.

The height of the combustion chamber from the end of the projection on the piston when the latter is at the end of the compression stroke to the exhaust valve at the top end of the chamber is also about equal to or somewhat less than half the diameter of the cylinder.

When the combustion chamber is used for a gas engine a lower compression is used than in the case of the high compression oil engine and this lower compression is obtained by using a piston which is not provided with a projection on its end such as is provided on the high compression oil engine piston. Further when the combustion chamber is used for a gas engine an electric sparking plug is fitted in either the aperture for the oil injector (which latter is not required for a gas engine) or in the aperture for the oil engine igniter if such an aperture is provided. The gas for combustion is admitted with the air through the air admission valve.

We have illustrated our invention by means of two sheets of drawings having five figures, in each of which the same or similar parts are indicated by the same reference letter. Parts which are similar to parts shown in our aforesaid British specification No. 29337 of 1912 are also indicated by the same reference letters as those in that specification.

Figure 2:
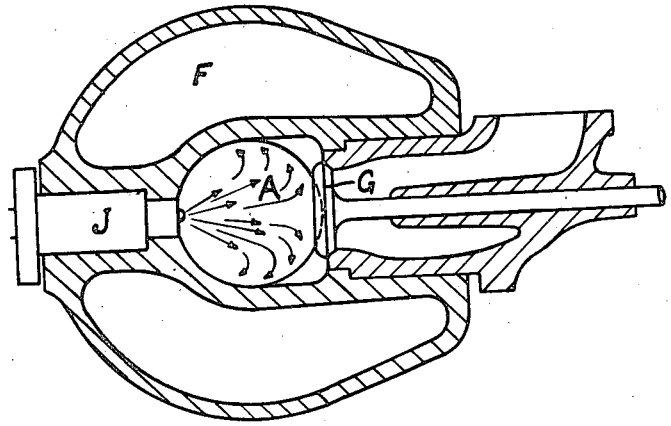
Figure 3:
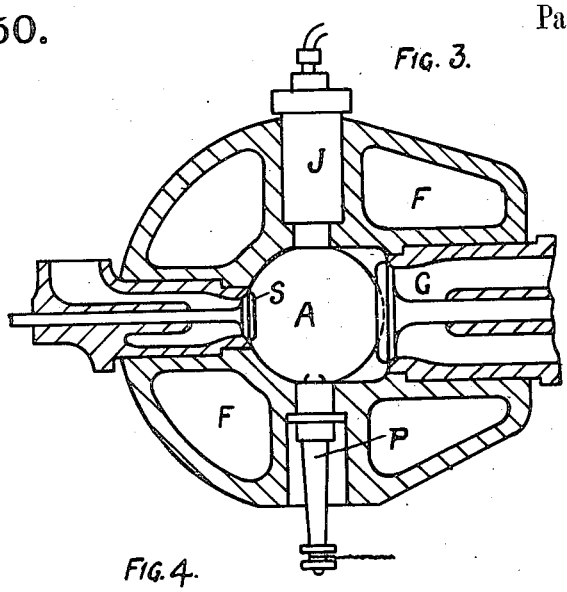
Figure 4:
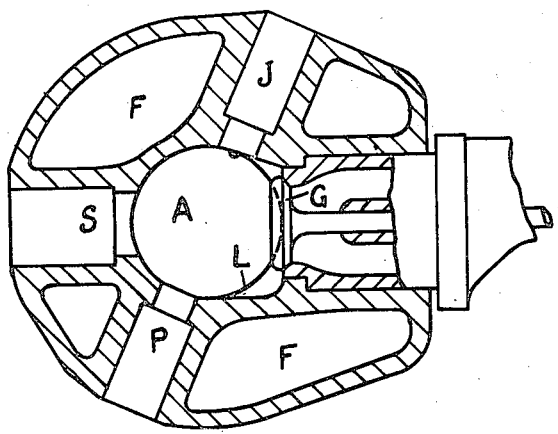
Figure 5:
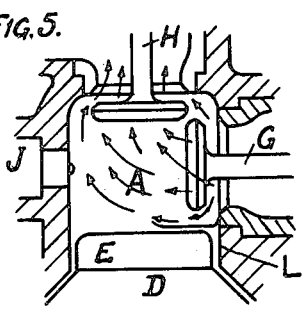

Figure 1 shows a sectional side elevation of the combustion chamber attached to the end of a water-jacketed cylinder of a vertical engine provided with a piston suitable for the use of oil as fuel. Fig. 2 is a sectional plan of the combustion chamber. Fig. 3 and Fig. 4 are sectional plans showing alternative arrangements of the oil injector, igniter (if one is used) and compressed air starter valve (if one is used). Fig. 5 is a part sectional elevation of the combustion chamber showing the exhaust valve and the air admission valve open during the scavenging period.

In these figures the combustion chamber is shown at A, the engine cylinder at C and the piston at D. The circular projection on the end of the oil engine piston is shown at E and the circular entrance to the combustion chamber from the cylinder is shown at L. The water-jacket is shown at F, the air admission valve at G, the vertical exhaust valve at H, the oil injector or the aperture for it at J, the igniter (if one is used) or the aperture for it at P, and a compressed air starting valve or the aperture for it at S.

In Fig. 1 the oil engine piston is shown with the circular projection E on its end in the position it occupies at the end of the compression stroke when the said projection has entered the circular entrance L and raised the compression of the air to a high degree.

In this example the circular entrance L is shown as being the same diameter as the combustion chamber and half the diameter of the cylinder but if desired it may be somewhat less than the diameter of the combustion chamber and somewhat less than half the diameter of the cylinder. The air admission valve G and the exhaust valve H are shown at the side and top respectively of the combustion chamber and are about equal distances from the center of the combustion chamber. The distance across the combustion chamber from the air admission valve to the oil injector is about equal to half the diameter of the cylinder C. This enables the compression to be carried much higher if required than in the arrangement described in our aforesaid specification. The fuel oil is injected in the form of spray through the oil injector J. The heat produced by the compression of the air in the cylinder and combustion chamber is high enough to ignite the oil immediately when it is sprayed into the heated air and no separate igniter is therefore necessary. In emergency cases however, such for instance as when no compressed air is available to enable a powerful turning effort to be given when the engine is being started, it is convenient to have an alternative or "stand by" method of ignition and we sometimes therefore make provision for the use of an emergency igniter (as shown for instance at P in Fig. 3) which may be either an electric sparking plug or a hot ignition tube, at the side of the combustion chamber about opposite to the oil injector sprayer. The first few ignitions can then be effected by the temporary use of the electric sparking plug (or hot ignition tube) while the engine is being turned by hand or other means and when if required the compression may be temporarily reduced by known means such as the use of a "half compression" cam. After a few ignitions the temporary igniter is put out of action and full compression allowed and the heat of the compression is then sufficient for ignition purposes.

The compressed air starting valve, when used, is placed at the one side of the combustion chamber preferably on a line axial with the air admission valve as shown at S. The cross section of the combustion chamber as shown in Figs. 2, 3 and 4 is substantially cylindrical but develops a flat side locally in the neighborhood of the air admission valve in order to allow a sufficient area for the air to pass the valve head into the combustion chamber during suction stroke and the scavenging period as clearly shown in Figs. 2 and 5.

When the combustion chamber is used for a gas engine the compression is reduced by using a piston which is not provided with a circular projection on its end but with a plain end such as that indicated by the dotted line Z in Fig. 1. With the gas engine the electric sparking plug is used as shown in Fig. 3 or it may be placed in the aperture provided for the oil injector J (which latter is not used on the gas engine) or two electric sparking plugs may be used one as shown at P, in Fig. 3 and one in place of the oil injector J. When the engine is arranged as a gas engine both air and gas are drawn into the cylinder on the suction stroke through the admission valve G.

It should be understood that in using the expression "gas" engine we mean an engine in which air and gas (or vapor) are drawn into the cylinder on the suction stroke and the mixture then compressed and ignited at about the end of the compression stroke. The gas may be of any known kind suitable for use in a gas engine such as town's gas, producer gas, furnace gas, and the gas or vapor of petrol, paraffin benzol, alcohol and similar fuels.

In some cases such as in large engines using oil as fuel it may be desirable to inject oil from two opposite sides of the combustion chamber in which case the electric sparking plug shown in Fig. 3 is replaced by a second oil injector similar to the one shown at J in Fig. 3. Similarly if desired two electric igniters may be used in the combustion chamber when the latter is used on a gas engine.

A combustion chamber constructed as described can be used at will either for a high compression oil engine or for a low compression gas engine, and from a manufacturing point of view this is a considerable advantage. Further it becomes a very simple matter to convert at any time a high compression oil engine into a low compression gas engine or vice versa.

When this combustion chamber is used on a high compression oil engine the eddying and mixing and scavenging effects are obtained as described and illustrated by stream lines in Figs. 2, 3 and 6 respectively of our aforesaid British specification No. 29337 of 1912 and as shown by stream lines in Figs. 2, 1 and 5 respectively of our present drawing.

Having now particularly described our invention, what we claim as new and desire to secure by Letters Patent is:—

1. In combination, a cylinder, a head for the cylinder having a cylindrical combustion chamber therein disposed concentrically with the cylinder, means for admitting compressed air into the chamber, and means for admitting a fuel into the chamber, both of said means being arranged transversely of the axis of said chamber and at diametrically opposite points.

2. In combination, a cylinder, a head for the cylinder having a cylindrical combustion chamber therein disposed concentrically with the cylinder, means for admitting compressed air into the chamber and means for admitting a fuel into the chamber, both of said means being arranged transversely of the axis of said chamber, and an exhaust outlet disposed substantially axially of the chamber.

3. In combination, a cylinder, a head for the cylinder having a cylindrical combustion chamber therein disposed concentrically with the cylinder, means for admitting air for combustion into said chamber transversely of the axis thereof, and means for injecting a fuel into said chamber transversely of the axis thereof.

4. In combination, a cylinder, a head for the cylinder having a cylindrical combustion chamber therein disposed concentrically with the cylinder, one vertical wall of said cylinder being flat and having an opening formed therein, a valve controlling said opening, an exhaust port formed in the top wall of said chamber, and a valve controlling said port.

5. In combination, a cylinder, a piston working within the cylinder, a combustion chamber at the compression end of the cylinder and communicating with the latter, means for admitting air to the chamber, said chamber being of such an area that the air therein will be compressed by the action of the piston to a degree sufficient to ignite an atomized fuel, and means for injecting an automized fuel into the chamber transversely of the axis of the chamber and of the air flowing from the cylinder into the chamber.

In testimony whereof we have signed our names to this specification.

KENNETH IRWIN CROSSLEY.
WILFRED LE PLASTRIER WEBB.

Witnesses:
S. W. GILLETT,
HERBERT ROWLAND ABBEY.